(12) United States Patent
Kerr et al.

(10) Patent No.: US 10,230,830 B2
(45) Date of Patent: Mar. 12, 2019

(54) SENSOR-BASED MUTE CONTROL FOR A SOFTPHONE CLIENT

(71) Applicant: Plantronics, Inc., Santa Cruz, CA (US)

(72) Inventors: Donald Hugh Kerr, Barden Ridge (AU); Lewis Collins, Southampton (GB)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/601,855

(22) Filed: May 22, 2017

(65) Prior Publication Data

US 2018/0338028 A1 Nov. 22, 2018

(51) Int. Cl.
*H04M 1/00* (2006.01)
*H04M 1/725* (2006.01)
*H04M 1/60* (2006.01)

(52) U.S. Cl.
CPC ..... *H04M 1/72569* (2013.01); *H04M 1/6033* (2013.01); *H04M 1/72577* (2013.01)

(58) Field of Classification Search
CPC .... H04R 1/1016; H04R 5/033; H04R 1/1008; H04R 1/105; H04S 7/304; G02B 27/017; G10K 2210/1081
USPC ............................................ 455/575.2, 569.1
See application file for complete search history.

(56) References Cited

U.S. PATENT DOCUMENTS 8,831,242 B2 9/2014 Brown et al.
2017/0193978 A1* 7/2017 Goldman ............. H04R 1/1041

* cited by examiner

*Primary Examiner* — Tu X Nguyen
(74) *Attorney, Agent, or Firm* — Jeremy S. DesRosier (57) ABSTRACT

A method is provided for sensor-based mute control for a softphone client. The method includes monitoring a softphone client, and detecting an incoming call to the softphone client. Also, the method includes starting a timer in response to detecting the incoming call. Further, the method includes receiving, from a headset, a don event, and, in response to receiving the don event from the headset, comparing an elapsed time of the timer to a predetermined time threshold. Moreover, the method includes sending an unmute command to the headset based on the comparison of the elapsed time to the predetermined time threshold.

17 Claims, 5 Drawing Sheets

SENSOR-BASED MUTE CONTROL FOR A SOFTPHONE CLIENT

FIELD

The present disclosure relates generally to the field of softphone applications. More particularly, the present disclosure relates to sensor-based mute control for a softphone client.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Some industries and companies mandate that the telephone handsets used by its personnel are equipped with functionality that ensures any transmission is the result of a user-driven decision. In other words, any outgoing transmission from a handset in such an environment must be an intentional user-driven act. Consequently, when not transmitting, such handsets are often muted. In fixed desk phones, this functionality is often embodied by way of a manual solution, such as a physical push-to-talk button. On such handsets, the handset only transmits when the user is holding the push-to-talk button, which may be located on the handset itself, in-line with the handset, or elsewhere. Creative personnel often develop bypasses to these manual solutions. For example, some personnel tape down the push-to-talk button, so that the handset is permanently in a transmitting state. Additionally, these manual solutions have been blamed for an increase in occupational repetitive strain injuries. Consequently, as industries and companies shift to voice over IP (VoIP) systems, where users interact with softphone applications instead of physical desk-based handsets, these manual solutions may be seen as being incompatible with the new technology, as well as generally undesirable for reasons of security and personnel health.

SUMMARY

In general, in one aspect, the invention relates to a method for sensor-based mute control for a softphone client. The method includes monitoring a softphone client, and detecting an incoming call to the softphone client. Also, the method includes starting a timer in response to detecting the incoming call. Further, the method includes receiving, from a headset, a don event, and, in response to receiving the don event from the headset, comparing an elapsed time of the timer to a predetermined time threshold. Moreover, the method includes sending an unmute command to the headset based on the comparison of the elapsed time to the predetermined time threshold.

In general, in one aspect, the invention relates to a method for sensor-based mute control for a softphone client. The method includes detecting an active call at a softphone client, and setting a call state to active based on the active call at the softphone client. Also, the method includes, during the active call, receiving a doff event from a headset, and setting a worn state to doffed. Furthermore, the method includes sending a mute command to the headset based on the worn state being set to doffed. Still yet, the method includes setting a mute state to muted, and receiving a don event from the headset while the worn state is set to doffed, the call state is set to active, and the mute state is set to muted. Moreover, the method includes, in response to receiving the don event from the headset, setting the worn state to donned. Still further, the method includes, after setting the worn state to donned, waiting to receive an unmute event, and receiving the unmute event.

In general, in one aspect, the invention relates to a system for sensor-based mute control of a softphone client. The system includes a headset manager storing a call state, a worn state, a mute state, and a predetermined time threshold. The system also includes at least one processor and memory coupled to the at least one processor. The memory stores instructions which, when executed by the at least one processor, cause the at least one processor to perform a process including monitoring a softphone client. Also, the instructions, when executed by the at least one processor, cause the at least one processor to detect an incoming call to the softphone client while monitoring the softphone client. Moreover, the instructions, when executed by the at least one processor, cause the at least one processor to, in response to detecting the incoming call, update the call state, and start a timer. Furthermore, the instructions, when executed by the at least one processor, cause the at least one processor to receive a don event from a headset. Additionally, the instructions, when executed by the at least one processor, cause the at least one processor to, in response to receiving the don event from the headset, update the worn state and compare an elapsed time of the timer to the predetermined time threshold. Still further, the instructions, when executed by the at least one processor, cause the at least one processor to send an unmute command to the headset based on the comparison of the elapsed time to the predetermined time threshold, and update the mute state.

The details of one or more implementations are set forth in the accompanying drawings and the description below. Other features will be apparent from the description and drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

Traditional solutions to user-driven transmit requirements are embodied as manual devices, such as physical buttons that must be held down, or grips that must be squeezed, in order for a user's handset microphone to be active. Such solutions are also known as push-to-talk buttons. Push-to-talk buttons may be installed as in-line attachments to a handset, within the handset itself, or elsewhere. Push-to-talk buttons are frequently and easily circumvented by personnel using little more than a strip of tape. Problematically, push-to-talk buttons are most often deployed to secure environments where transmissions must be limited, and any measure that circumvents the push-to-talk mechanism is considered a security risk. Additionally, push-to-talk buttons have been blamed for some repetitive strain injuries. As companies and industries shift to VoIP systems, physical push-to-talk buttons not only present security concerns, but are an unnecessary line item, as the traditional handset is being altogether removed from users' desks.

Disclosed herein are systems, methods, and computer programs for sensor-based mute control functionality that is not easily circumvented, eliminates any potential for repetitive strain injury, and does not require the purchase of additional hardware for implementation at a user's computer. The systems, methods, and computer programs disclosed herein provide a unique solution to secure voice transmission requirements in environments deploying softphones, while mitigating security concerns associated with traditional hardware. The systems, methods, and computer programs disclosed herein eliminate the need for a physical push-to-talk button by relying on state information received from various sources, and automate the process of muting and/or unmuting a microphone according to the state information, thereby eliminating the likelihood of unintended voice transmissions, which is present in systems that require the user to manually mute his or her microphone.

Figure 1A:
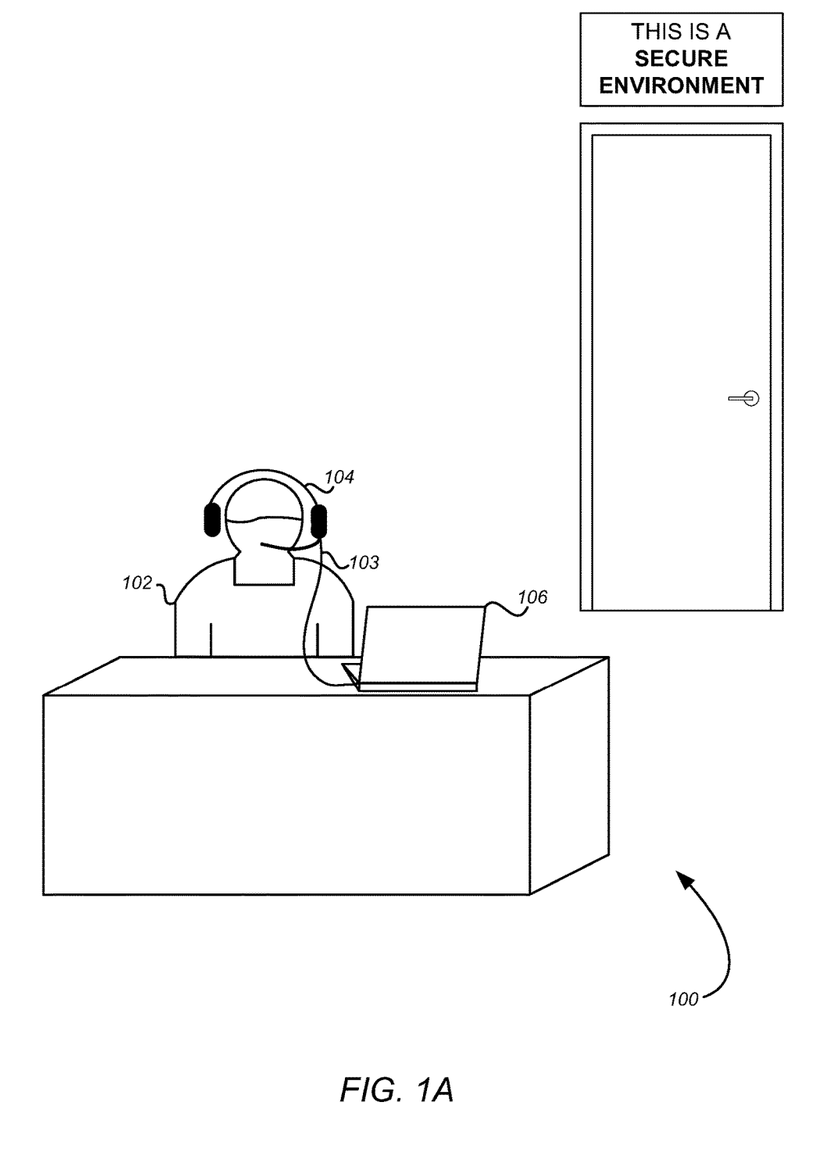
FIGS. 1A-1C depict a system for sensor-based mute control for a softphone client, in accordance with one or more embodiments of the invention.

FIG. 1A shows a system 100 for sensor-based mute control for a softphone client according to one or more embodiments. Although the elements of the system 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1A may be omitted, repeated, and/or substituted. Accordingly, various embodiments may lack one or more of the features shown. For this reason, embodiments of the invention should not be considered limited to the specific arrangements of elements shown in FIG. 1A.

As depicted in FIG. 1A, the system 100 includes a host device 106 in communication with a headset 104. In one or more embodiments, the host device 106 includes a softphone application for initiating and receiving telephone calls. As shown in FIG. 1A, the headset 104 is worn by a user 102. As described herein, the user 102 includes a person. The headset 104 may include any body-worn device with a speaker proximate to an ear of the user 102, and a microphone for monitoring the speech of the user 102. Accordingly, the headset 104 may include a monaural headphone or stereo headphones, whether worn by the user 102 over-the-ear (e.g., circumaural headphones, etc.), in-ear (e.g., earbuds, earphones, etc.), or on-ear (e.g., supraaural headphones, etc.). The headset 104 may be utilized by the user 102 to participate in the telephone calls that are sent and received via the host device 106.

As described herein, the host device 106 includes any computing device capable of storing and processing digital information on behalf of the user 102. In one or more embodiments, and as depicted in FIG. 1A, the host device 106 comprises a laptop computer. However, for reasons that will become clear upon reading the present disclosure, it is understood that the host device 106 may comprise a desktop computer, cellular phone (e.g., smartphone), tablet computer, or other computing device of the user 102. In one or more embodiments, the host device 106 is communicatively coupled with a network. The network may be a communications network, including a public switched telephone network (PSTN), a cellular network, an integrated services digital network (ISDN), a local area network (LAN), and/or a wireless local area network (WLAN), that support standards such as Ethernet, wireless fidelity (Wi-Fi), and/or voice over internet protocol (VoIP).

As shown in FIG. 1A, the headset 104 and the host device 106 communicate over a communications link 103. The host device 106 may exchange audio with the headset 104 via the communications link 103. For example, the headset 104 may be utilized by the user 102 to listen to phone calls received at the host device 106, and to transmit speech that is spoken by the user 102 during the phone calls. Further, the headset 104 may send messages to the host device 106, as well as receive messages from the host device 106, via the communications link 103. The messages may be sent by the host device 106 and/or the headset 104 based on an interaction of the user 102 with controls of the host device 106 and/or the headset 104. Such controls may include physical controls (e.g., buttons, dials, switches, keys, etc.) as well as controls in a software-based user interface of the host device 106. In one or more embodiments, the communications link 103 may include a wired link such as, for example, a USB connection. In one or more embodiments, the communications link 103 may include a wireless link, such as, for example, a Bluetooth link, a Digital Enhanced Cordless Telecommunications (DECT) link, a cellular link, a Wi-Fi link, etc.

Figure 1B:
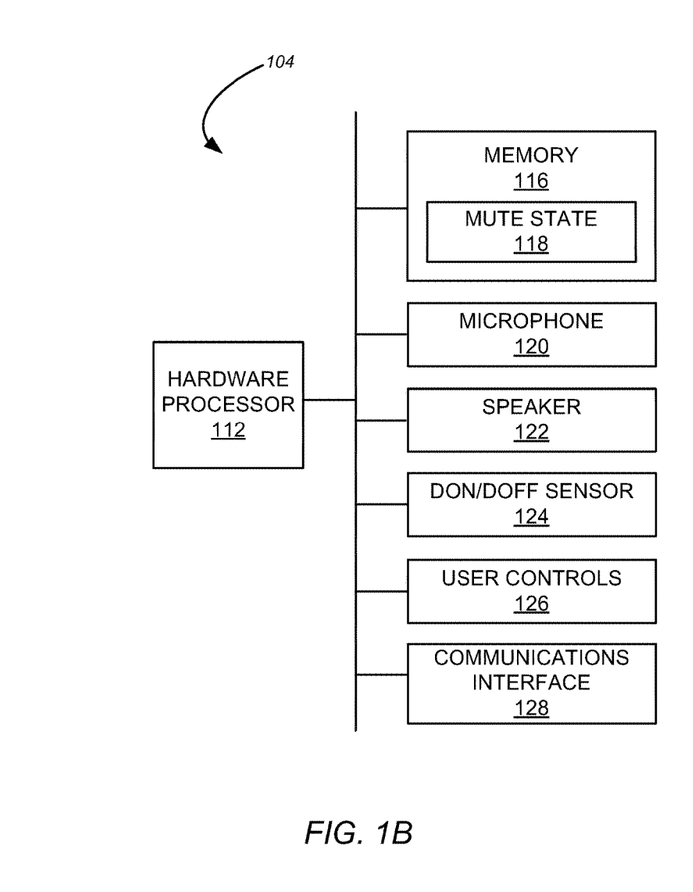

FIG. 1B shows a block diagram of a headset 104 for sensor-based mute control for a softphone client, according to one embodiment. Although the elements of the headset 104 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1B may be omitted, repeated, and/or substituted. Accordingly, various embodiments may lack one or more of the features shown. For this reason, embodiments of the invention should not be considered limited to the specific arrangements of elements shown in FIG. 1B.

As shown in FIG. 1B, the headset 104 includes a hardware processor 112 operably coupled to a memory 116, a microphone 120, a speaker 122, a don/doff sensor 124, one or more user controls 126, and a communications interface 128. In one or more embodiments, the hardware processor 112, the memory 116, the microphone 120, the speaker 122, the don/doff sensor 124, the user controls 126, and the communications interface 128 may remain in communication over one or more communications busses.

As described herein, the communications interface 128 includes any interface for transmitting information to and receiving information from the host device 106. Accordingly, the communications interface 128 includes a receive channel, for receiving audio from the host device, which may be played through the speaker 122; and a transmit channel, which may be used to transmit audio picked up by the microphone 120. In one or more embodiments, the communications interface 128 includes a Universal Serial Bus (USB) transceiver or USB microcontroller. In one or more embodiments, the communications interface 128 includes a wireless transceiver and antenna coupled to the wireless transceiver, where the antenna converts electric power into radio waves under the control of the wireless transceiver, and intercepts radio waves which it converts to electric power and provides to the wireless transceiver. Accordingly, by way of the wireless transceiver and the antenna, the headset 104 may form a wireless link with the host device 106. The wireless transceiver may be, for example, a DECT transceiver, Bluetooth transceiver, or IEEE 802.11 (Wi-Fi) transceiver.

As described herein, the user controls 126 include any mechanism of the headset 104, mechanical and/or electronic, that responds to user operation. The user controls 126 may include one or more of a button, a slide switch, a capacitive sensor, a touch screen, etc. The hardware processor 112 controls the transmission of messages to the host device 106, via the communications interface 128, in response to user operation (e.g., button presses, switches, etc.) of the user controls 126.

The microphone 120 includes any device that transforms received sound waves into a detectable electric current. The speaker 122 includes any device that transforms an electric current into sounds heard by a user of the headset 104.

As described herein, the don/doff sensor 124 includes any mechanism that detects and reports a worn state, and/or a change in the worn state, of the headset 104. For example, the don/doff sensor 124 may report that the headset 104 is donned or has been donned. As described herein, a headset is donned when it is positioned on the head of a user such that the user can participate in a phone call using the microphone 120 and the speaker 122 of the headset 104. Also, the don/doff sensor 124 may report that the headset 104 is doffed or has been doffed. As described herein, a headset is doffed when it is no longer positioned on the head of the user. For example, when doffed, the headset 104 may be worn around the neck of the user, set on a table, hung from a base station, or held in the hand of the user. The don/doff sensor 124 may determine, based on a comparison of its received input to a threshold, whether the headset 104 has been placed on the head of the user, or removed from the head of the user. The hardware processor 112 may transmit events to the host device 106, via the communications interface 128, in response to don and doff determinations of the don/doff sensor 124.

In one or more embodiments, the don/doff sensor 124 may include a proximity sensor. For example, the don/doff sensor 124 may include a sonic or optical assembly that is used to determine the distance of a user from the headset 104. In one or more embodiments, the don/doff sensor 124 may include a capacitive sensor. For example, the don/doff sensor 124 may include a sensing electrode, and current to the sensing electrode may be monitored to detect any changes in capacitance, which may be used to determine when the headset 104 is touching one or both ears of a user. In one or more embodiments, the don/doff sensor 124 may include a mechanical switch. For example, the mechanical switch may be opened or closed when the headset is worn on the head of a user. In one or more embodiments, the don/doff sensor 124 may include a strain gauge. For example, an impedance of the strain gauge may be used to determine whether the headset 104 is being worn by a user.

As described herein, the hardware processor 112 processes data, including the execution of applications stored in the memory 116. In one or more embodiments, the hardware processor 112 may transmit events, via the communications interface 128, to the host device 106 in response to input from the don/doff sensor 124. In one or more embodiments, the hardware processor 112 may transmit events, via the communications interface 128, to the host device 106 in response to user operation (e.g., button presses, switches, etc.) of the controls 126. In one or more embodiments, and as described below, the hardware processor 112 may receive commands (e.g., mute on, mute off, etc.), via the communications interface 128, from the host device 106. Such commands may be received from the host device 106 in response to an interaction of the user with the host device 106.

In one or more embodiments, the hardware processor 112 is a high performance, highly integrated, and highly flexible system-on-chip (SOC), including signal processing functionality such as echo cancellation/reduction and gain control in another example. In one or more embodiments, the hardware processor 112 may include a variety of processors (e.g., digital signal processors, etc.), analog-to-digital converters, digital-to-analog converters, etc., with conventional CPUs being applicable.

As described herein, the memory 116 includes any storage device capable of storing information temporarily or permanently. The memory 116 may include volatile and/or non-volatile memory, and may include more than one type of memory. For example, the memory 116 may include one or more of SDRAM, ROM, and flash memory. In one or more embodiments, the memory 116 may store pairing information for connecting with the host device 106, user preferences, and/or an operating system (OS) of the headset 104.

As depicted in FIG. 1B, the memory 116 stores a mute state 118. The mute state 118 controls whether, at a present time, the microphone 120 is currently muted or unmuted. In particular, when the microphone 120 is unmuted, audio picked up by the microphone 120 is transmitted, by the hardware processor 112 via the communications interface 128, as a signal in a transmit channel to the host device 106. The signal may be digital or analog. When the microphone 120 is muted, the hardware processor 112 ceases to transmit to the host device 106 the audio picked up by the microphone 120. In one or more embodiments, where the signal sent in the transmit channel is a digital signal, this may be accomplished by sending an empty transmit stream (i.e., "00000000 . . . " stream, etc.) over the transmit channel. In other words, when the mute state 118 indicates that the headset 104 is muted, the headset 104 stops transmitting to the host device 106 any audio that may be picked up by the microphone 120. As an option, the mute state 118 may be tracked by way of a bit, a Boolean value, a flag, or any other value in the memory 116.

Figure 1C:
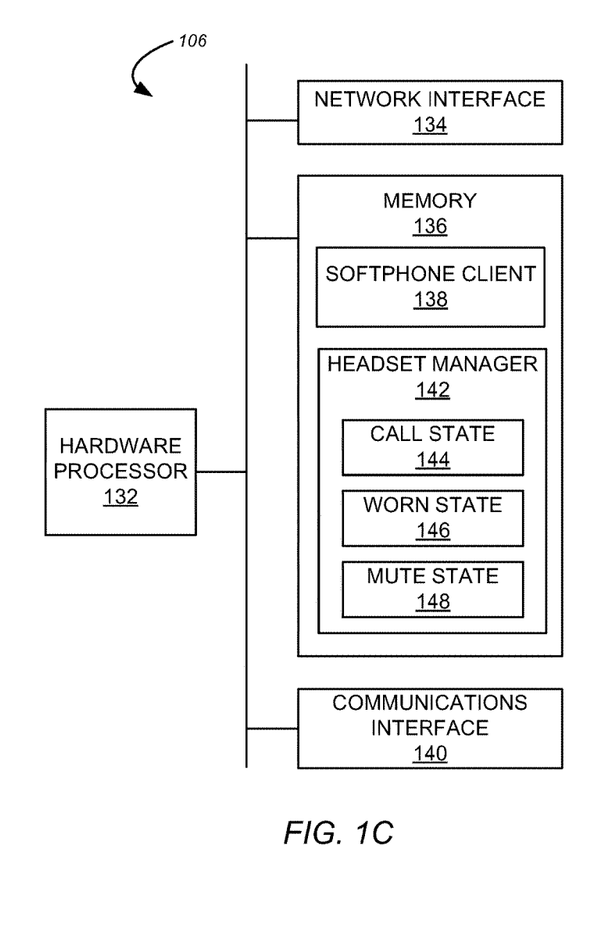

In one or more embodiments, the memory 116 of the headset 104 may also store a worn state. For example, based upon the output of the don/doff sensor 124, the headset 104 may continuously track whether or not the headset 104 is currently being worn by a user. A worn state tracked in the memory 116 of the headset 104 may match the worn state 146 tracked in the memory 136 of the host device 106.

FIG. 1C shows a block diagram of a host device 106 for sensor-based mute control for a softphone client, according to one embodiment. Although the elements of the host device 106 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1C may be omitted, repeated, and/or substituted. Accordingly, various embodiments may lack one or more of the features shown. For this reason, embodiments of the invention should not be considered limited to the specific arrangements of elements shown in FIG. 1C.

As shown in FIG. 1C, the host device 106 includes a hardware processor 132 operably coupled to a memory 136, a communications interface 140, and a network interface 134. In one or more embodiments, the hardware processor 132, the memory 136, the communications interface 140, and the network interface 134 may remain in communication over one or more communications busses. Although not depicted in FIG. 1C for purposes of simplicity and clarity, it is understood that, in one or more embodiments, the host device 106 may include one or more of a display, a haptic device, and an input device (e.g., mouse, keyboard, capacitive sensor, touch screen, etc.).

As described herein, the hardware processor 132 processes data, including the execution of applications stored in the memory 136. In one or more embodiments, the hardware processor 132 may include a variety of processors (e.g., digital signal processors, etc.), analog-to-digital converters, digital-to-analog converters, etc., with conventional CPUs being applicable.

The communications interface 140 includes any interface for transmitting information to and receiving information from the headset 104. Accordingly, the host device 106 may receive a first audio signal from the headset 104 via the communications interface 140 (e.g., audio picked up by the microphone 120, etc.), and transmit a second audio signal to the headset 104 via the communications interface 140 (e.g., audio to be played by the speaker 122, etc.). In one or more embodiments, the communications interface 140 includes a Universal Serial Bus (USB) transceiver or USB microcontroller. In one or more embodiments, the communications interface 140 includes a wireless transceiver and antenna coupled to the wireless transceiver. Accordingly, by way of the wireless transceiver and the antenna, the host device 106 may form a wireless link with the headset 104. The wireless transceiver may be, for example, a DECT transceiver, Bluetooth transceiver, or IEEE 802.11 (Wi-Fi) transceiver.

As described herein, the network interface 134 allows for communication, using digital and/or analog signals, with one or more other devices over a network. The network may include any private or public communications network, wired or wireless, such as a local area network (LAN), wide area network (WAN), or the Internet. In one or more embodiments, the network interface 134 may provide the host device 106 with connectivity to a cellular network. Accordingly, the network interface 134 provides a pathway for the host device 106 to send and receive voice communications over an Internet Protocol (IP) network, also referred to herein as VoIP communications. Such VoIP communications may be sent and received using a softphone client 138.

As described herein, the memory 136 includes any storage device capable of storing information temporarily or permanently. The memory 136 may include volatile and/or non-volatile memory, and may include more than one type of memory. For example, the memory 136 may include one or more of SDRAM, ROM, and flash memory. In one or more embodiments, the memory 136 may store pairing information for connecting with the headset 104, user preferences, and/or an operating system (OS) of the host device 106.

In one or more embodiments, the memory 136 stores applications executable by the hardware processor 132, such as a telephony application, a call management application, a mute control application, a calendar application, an email application, and/or a messaging application. As depicted in FIG. 1C, the memory 136 stores a softphone client 138 and a headset manager 142. As described herein, the softphone client 138 includes any application on the host device 106 that allows a user of the host device 106 to send and receive VoIP communications (e.g., VoIP calls, etc.) using the host device 106. Examples of commercially available softphone clients include Microsoft® Skype®, Microsoft® Skype for Business, Cisco® IP Communicator, Cisco Jabber®, Cisco Spark®, Broadsoft® UC-One®, Avaya® Communicator, and Avaya® IP Softphone. The softphone client 138 may support, for example, one or more of Session Initiation Protocol (SIP), H.323, Media Gateway Control Protocol (MGCP), Real-time Transport Protocol (RTP), Real-time Transport Control Protocol (RTCP), Secure Real-time Transport Protocol (SRTP), Session Description Protocol (SDP), Skinny Client Control Protocol (SCCP), and Inter-Asterisk eXchange (IAX) protocol.

In one or more embodiments, the softphone client 138 may open the headset 104, via the communications interfaces 128 and 140, in an exclusive mode. The softphone client 138 may open the headset 104 to answer an incoming call, or when initiating a new outgoing call. When opened by the softphone client 138, the headset 104 may be presented as a render endpoint (e.g., via the speaker 122, etc.) and/or a capture endpoint (e.g., via the microphone 120, etc.). In such embodiments, once the headset 104 has been opened in the exclusive mode by the softphone client 138, other applications resident on the host device 106 may be precluded from also capturing audio from the microphone 120 of the headset 104. Moreover, when the headset 104 is muted (i.e., the mute state 118 indicates that the headset 104 is muted), the softphone client 138 may be precluded from capturing audio from the microphone 120 of the headset 104. Further, when the headset 104 is muted, all applications resident on the host device 106 may be precluded from capturing audio from the microphone 120 of the headset 104.

As described herein, the headset manager 142 includes any software component that mediates interactions between the softphone client 138 and the headset 104. In particular, the headset manager 142 receives events from the headset 104 in response to interactions of the headset 104 with a user of the headset 104. For example, the headset manager 142 may receive an event from the headset 104 that indicates the user has pushed a mute button on the headset 104. As another example, the headset manager 142 may receive an event from the headset 104 that indicates the user has donned the headset 104. Still yet, the headset manager 142 may receive an event from the headset 104 that indicates the user has doffed the headset 104.

In one or more embodiments, the headset manager 142 may include an application that is installed independently of the softphone client 138. In one or more embodiments, the headset manager 142 may comprise a module that is included in, or installed with, the softphone client 138, such as an add-in or module. As depicted, the headset manager 142 tracks a call state 144 of the softphone client 138, a worn state 146 of the headset 104, and a mute state 148 of the headset 104. The call state 144 indicates whether the softphone client 138 is currently active on a phone call. For example, the call state 144 may include a first value that indicates the softphone client 138 is currently on a call, or a second value that indicates the softphone client 138 is not currently on a call. As an option, the call state 144 may include a third value that indicates the softphone client 138 has received an incoming call that has not yet been answered. The call state 144 may be tracked in the memory 136 using any feasible mechanism, such as one or more bits or flags. The call state 144 may be updated according to events received from the softphone client 138, by actively monitoring the softphone client 138, by subscribing to events from the softphone client 138, and/or by actively monitoring resources (e.g., processes, ports, services, etc.) used by the softphone client 138 for sending and receiving VoIP communications.

In one or more embodiments, the headset manager 142 may include a time threshold, and a timer, which may be associated with the call state 144. The timer may track a time that has elapsed between the softphone client 138 receiving an incoming call, and the call being answered by a user. In other words, the headset manager 142 may include a timer for tracking the time it takes a user to answer a call received at the softphone client 138. The headset manager may compare the tracked time to the time threshold, as described below.

The worn state 146 reflects a current worn state of the headset 104. For example, the worn state 146 may include a first value that indicates the headset 104 is currently donned by a user, or a second value that indicates the headset 104 is currently doffed. As an option, the worn state 146 may be tracked by way of a bit, a Boolean value, a flag, or any other value in the memory 136.

The mute state 148 reflects a current mute status of the headset 104. For example, the mute state 148 may include a first value that indicates the microphone 120 of the headset 104 is currently muted, or a second value that indicates the microphone 120 of the headset 104 is currently unmuted. As an option, the mute state 148 may be tracked by way of a bit, a Boolean value, a flag, or any other value in the memory 136.

In one or more embodiments, the softphone client 138 and/or the headset manager 142 may be operable to send messages to, and receive messages from, the headset 104. The messages may include commands and/or events. As described herein, a command is a message from a sender to a recipient instructing the recipient to perform a specific action responsive to receiving the command. An event is a message from a sender to a recipient that alerts the recipient to an interaction that has occurred at the sender. As described below, the headset 104 may send and receive events and commands, to and from the host device 106. The host device 106 may send and receive events and commands, to and from the headset 104. Moreover, applications resident in the memory 136 may send and receive events and commands to each other. In particular, the headset manager 142 and the softphone client 138 may exchange events and commands, such as when a call is incoming to the softphone client 138, or terminated at the softphone client 138. For example, the headset manager 142 may send a command to the softphone client 138, instructing the softphone client 138 to answer an incoming call.

The softphone client 138 and/or the headset manager 142 may receive events indicating that one of the user controls 126 (e.g., a mute button) has been pressed by a user. Also, the softphone client 138 and/or the headset manager 142 may receive events indicating that the headset 104 has been donned or doffed by the user. Additionally, the softphone client 138 and/or the headset manager 142 may send a command instructing the headset 104 to mute or unmute a transmit channel of the communications interface 128 from the headset 104.

The headset manager 142 determines the mute state 148 for the headset 104 based on one or more of the call state 144, the worn state 146, and the events received from the headset 104. In one or more embodiments, the headset manager 142 may set the mute state 148 to muted whenever the call state 144 indicates that the softphone client 138 is not presently in a call. For example, in response to a user connecting the headset 104 to the host device 106 when the call state 144 indicates that a call is not active at the softphone client 138, the headset manager 142 may send a mute command to the headset 104 and set the mute state 148 to muted. Similarly, when a call at the softphone client 138 is terminated, the headset manager 142 may be notified of the termination by the softphone client 138, or detect the termination by monitoring the softphone client 138. In either case, when the call state 144 transitions to a state indicating that no call is active at the softphone client 138, the headset manager 142 may send a mute command to the headset 104 and set the mute state 148 to muted. As an option, the headset manager 142 may only set the mute state 148 to muted upon receiving an acknowledgement message from the headset 104 that confirms the microphone 120 of the headset 104 has been muted. Receiving an acknowledgement message may include receiving an empty transmit channel (e.g., "00000000 . . . " stream, etc.) from the headset 104.

In one or more embodiments, the headset manager 142 may ensure that the headset 104 is muted whenever the headset 104 is not being worn. In other words, whenever the worn state 146 indicates that the headset 104 is presently doffed, the mute state 118 at the headset 104 and the mute state 148 at the host device 106 are set to muted by the headset manager 142, such that the headset 104 is muted.

In one or more embodiments, the headset manager may discover events from the headset 104 and/or the softphone client 138 via another application executing on the host device 106. In other words, the other application may serve as an intermediary between the headset manager 142 and the headset 104, and/or as an intermediary between the headset manager 142 and the softphone client 138. For example, the other application may expose events from the headset 104, such as mute on, mute off, don, and/or doff via an Application Program Interface (API). Also, the other application may expose events from the softphone client 138, such as when a VoIP call is incoming and/or in progress.

Figure 2:
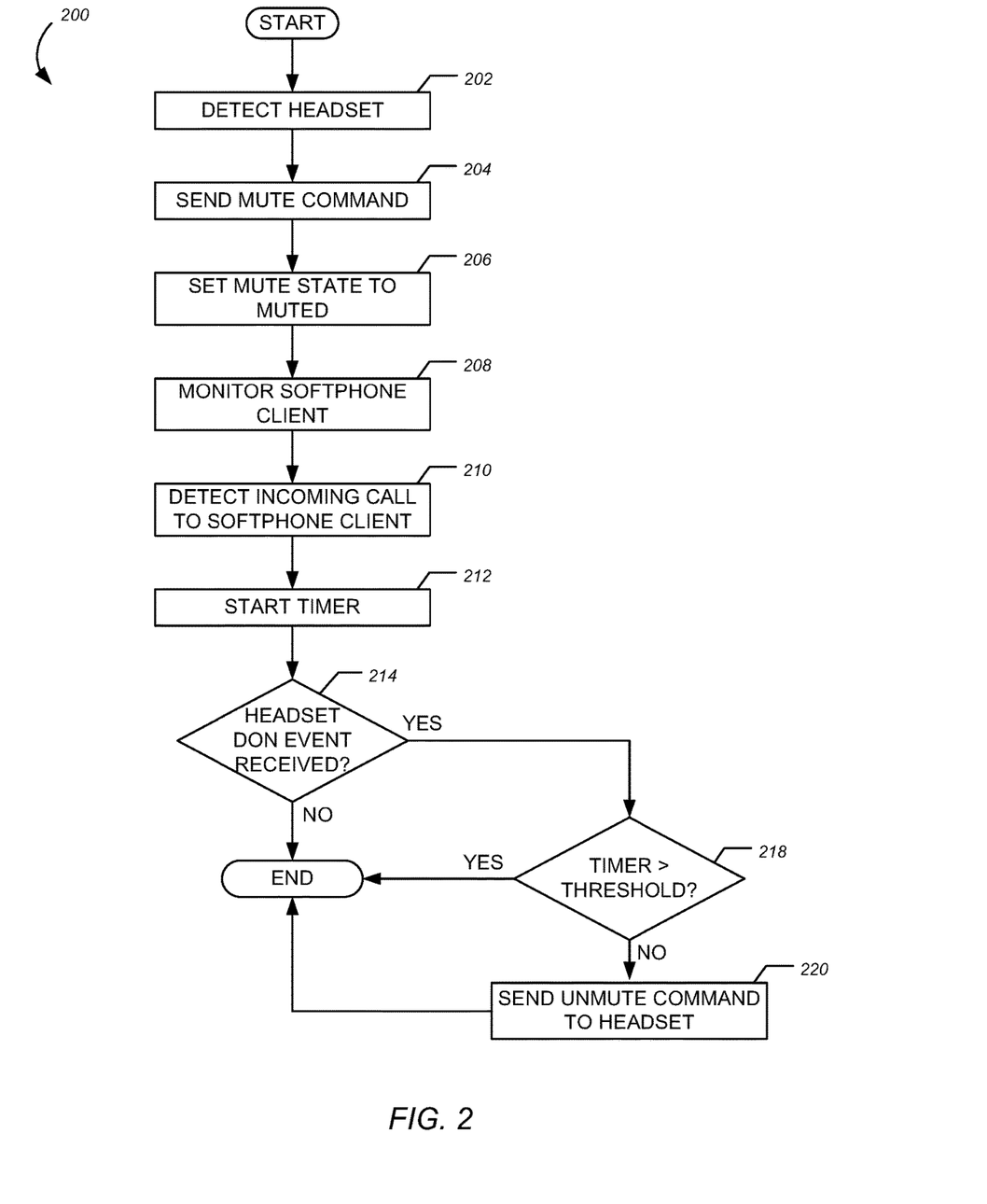
FIG. 2 is a flow diagram showing a method for sensor-based mute control for a softphone client, in accordance with one or more embodiments of the invention.

FIG. 2 shows a flowchart of a method 200 for sensor-based mute control for a softphone client, in accordance with one or more embodiments of the invention. While the steps of the method 200 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 200 may be carried out by a headset management application resident on a host device, such as the headset manager 142 of the host device 106 of the system 100, described hereinabove in reference to FIGS. 1A and 1C.

At step 202, a headset is detected. The headset may be detected in response to the headset being powered on, connected to a host device, and/or due to being discovered by an application, such as a softphone client. For example, the headset may be detected upon being plugged in to a USB port of a host device, or after establishing another communications link to the host device.

In one or more embodiments, upon detecting the headset, a call state may be determined. For example, the call state may be determined by polling a softphone client (e.g., the softphone client 138, etc.) to determine whether a phone call is active at the softphone client. Accordingly, if it is determined that a phone call is active at the softphone client, then a locally stored call state may be updated to reflect that a call is currently active; but if it is determined that no phone call is currently active at the softphone client, then the locally stored call state may be updated to reflect that no call is currently active.

In one or more embodiments, upon detecting the headset, a worn state of the headset may be determined. For example, the worn state may be determined based on the output of a don/doff sensor (e.g., the don/doff sensor 124, etc.) of the headset. Accordingly, if it is determined that the headset is being worn by a user, then a locally stored worn state may be updated to reflect that the headset is currently being worn; but if it is determined that the headset is not currently being worn by the user, then the locally stored worn state may be updated to reflect the headset is not presently worn by the user.

In the context of the present description of the method 200, it may be assumed that, prior to an incoming call being answered (e.g., the call detected at step 210, etc.), no phone call is active at the softphone client, and the headset is not being worn by a user.

A mute command is sent to the headset at step 204. The mute command comprises any message to the headset that causes the headset to cease transmission of a signal that contains audio picked up by a microphone of the headset. The mute command may be sent to the headset in response to detecting the headset and determining that no call is active at the softphone client, such as, for example, by using the call state. In one or more embodiments, when the headset receives the mute command, the headset may respond with a message that confirms it has been muted. For example, the headset may respond with an acknowledgement message, or a mute event indicating that the microphone has been muted. Upon being muted, a value stored locally at the headset may be updated to reflect the muted state. For example, the mute state 118 of the headset 104, described in the context of FIG. 1B, above, may be updated to reflect that the headset 104 is muted. Moreover, at step 206, a locally stored mute state of the headset manager is set to muted. For example, the mute state 148 of the headset manager 142, described in the context of FIG. 1C, above, may be updated to reflect that the headset 104 is muted.

Also, at step 208, a softphone client is monitored. Monitoring the softphone client may include any operation that enables the detection of an incoming call at the softphone client. In one or more embodiments, monitoring the softphone client may include subscribing to and/or receiving events from the softphone client. For example, the softphone client may be exposed for monitoring via an API. In one or more embodiments, monitoring the softphone client may include monitoring resources used by the softphone client for sending and receiving VoIP communications.

Accordingly, at step 210, an incoming call to the softphone client is detected. The incoming call may include any incoming request for a VoIP call. In response to the incoming call being detected, a timer is started at step 212. The timer may include any mechanism for determining a time elapsed since the incoming call was first received. In other words, the timer may be used to determine how long it takes for a user to answer the incoming call to the softphone client. Also, in response to the incoming call being detected, the locally stored call state may be updated to reflect that the incoming call has not yet been answered.

At step 214, it is determined whether a headset don event has been received. The headset don event may be received from the headset based on the output of a don/doff sensor at the headset. If no headset don event is received, then the method 200 ends. In other words, if the user fails to don his or her headset in response to the incoming call, then the user may not be present to answer the call. Accordingly, the incoming call may be terminated without being answered, be forwarded to another device, or be forwarded to the user's voicemail.

However, if a headset don event is received at step 214, then the worn state stored locally at the host device (e.g., the worn state 146 of the host device 106, etc.) may be updated to reflect the donned state of the headset. In one or more embodiments, an answer call command is sent to the softphone client after the headset is donned. The answer call command may be sent using an API of the softphone client. The answer call command may be sent to the softphone client from the headset manager, or another application executing on the host device. When the call is answered by the softphone client, the call state stored locally at the host device (e.g., the call state 144 of the host device 106, etc.) may be updated to reflect that the softphone client has an active call.

The timer started at step 212 may be stopped in response to one or more of receiving the headset don event, updating the stored worn state, sending an answer call command to the softphone client, updating the call state, and the call being answered by the softphone client. If a headset don event is received at step 214, then, at step 218, the timer is compared to a threshold. The threshold includes any predetermined time limit maintained by a headset manager. The threshold may be measured in seconds (e.g., 5 seconds, 10 seconds, 15 seconds, 30 seconds, etc.). In one or more embodiments, the threshold may be configured ahead of time by the user, or the user's organization.

If it is determined, at step 218, that the value of the timer is not greater than the threshold, then the method 200 proceed to step 220. At step 220, an unmute command is sent to the headset. The unmute command comprises any message to the headset that causes the headset to transmit a signal containing audio originating from a microphone of the headset. In one or more embodiments, when the headset receives the unmute command, the headset may respond with a message that confirms it has been unmuted.

For example, the headset may respond with an acknowledgement message, or an unmute event indicating that the microphone has been unmuted. Upon being unmuted, a value stored at the headset may be updated to reflect the unmuted state. For example, the mute state 118 of the headset 104, described in the context of FIG. 1B, above, may be updated to reflect that the headset 104 is unmuted. Moreover, the mute state stored locally at the host device (e.g., the mute state 148 of the host device 106, etc.) may be updated to reflect that the headset is currently unmuted.

Accordingly, if the if the headset is donned for an incoming call by a user within a threshold time limit, then the steps of the method 200 ensure that the call is answered by the softphone client, and the headset's microphone is unmuted so that the user may transmit audio for the call. In other words, the user's donning of the headset within the threshold time limit in response to an incoming call may be treated as an expression of intent from the user to begin transmitting audio picked up by the microphone of the headset.

However, if it is determined, at step 218, that the value of the timer is greater than the threshold, then the method 200 ends without unmuting the microphone of the headset. In other words, if the timer exceeds the threshold, then the incoming call may be answered by the softphone client, but the microphone of the user's headset remains muted, such that no audio is captured and transmitted by the headset. In this way, the user's donning of the headset outside of the threshold time limit in response to the incoming call may be treated as a lack of positive intent of the user to transmit audio picked up by the microphone of the headset.

In one or more embodiments, once the call is ended, the headset manager may automatically mute the microphone of the headset. For example, the headset manager may continue to monitor the softphone client for an end call event from the softphone client. In response to the end call event, the call state may be updated to reflect that no call is active. Moreover, in response to the end call event or the updated call state indicating that no call is active, the headset manager may send a mute command, such as the mute command 204, to the headset, and the headset may respond as described above. In this way, a microphone of the headset may be muted whenever the user has not performed a predetermined set of actions that have been defined to express an intention to transmit audio.

Figure 3:
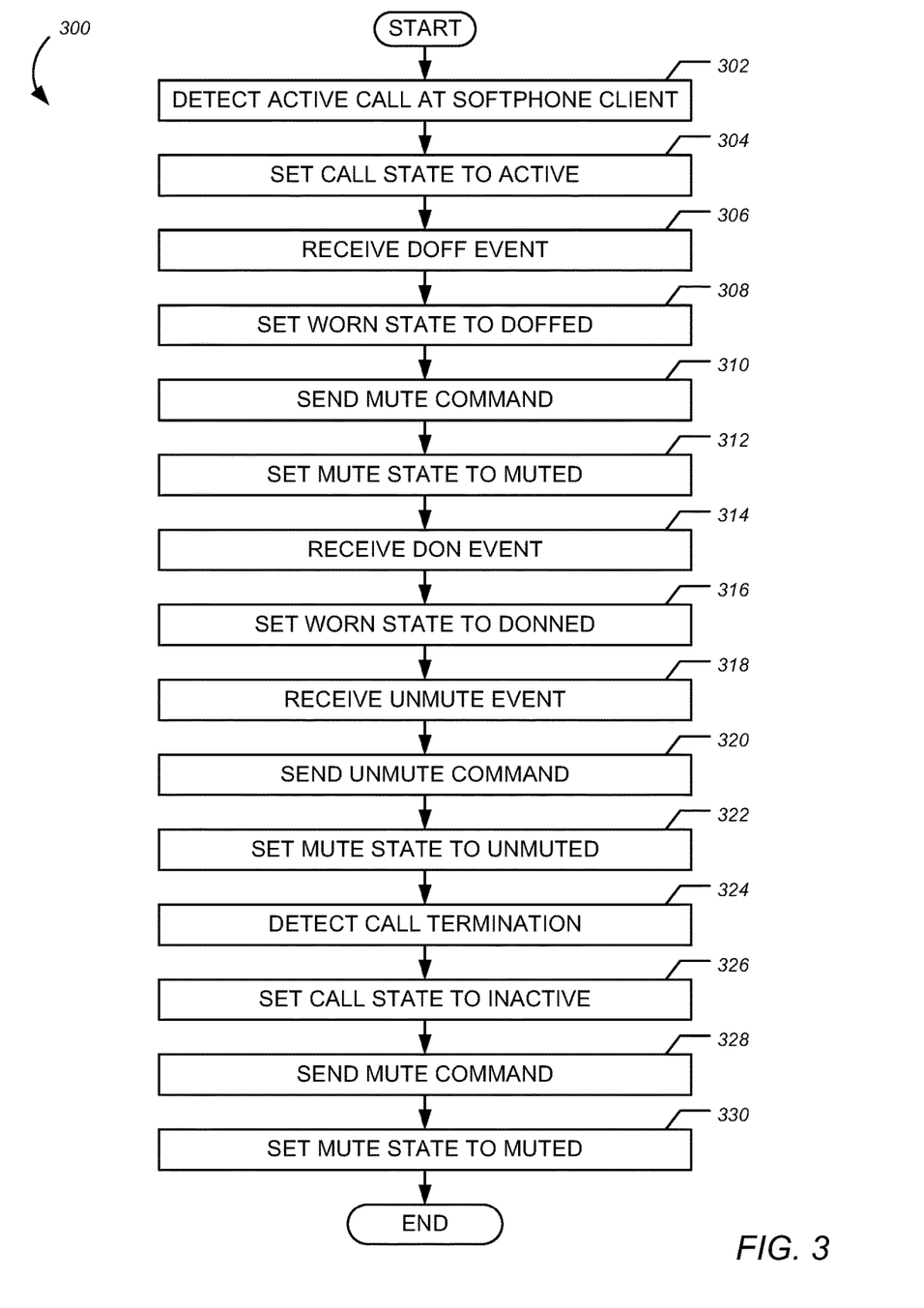
FIG. 3 is a flow diagram showing a method for sensor-based mute control for a softphone client, in accordance with one or more embodiments of the invention.

FIG. 3 shows a flowchart of a method 300 for sensor-based mute control for a softphone client, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 300 may be carried out by a headset management application resident on a host device, such as the headset manager 142 of the host device 106 of the system 100, described hereinabove in reference to FIGS. 1A and 1C.

At step 302, an active call at a softphone client is detected. The active call may be detected by monitoring the softphone client. Monitoring the softphone client may include any operation that enables the detection of an incoming call, or an in progress call, at the softphone client. In one or more embodiments, monitoring the softphone client may include subscribing to and/or receiving events from the softphone client. For example, the softphone client may be exposed for monitoring via an API. In one or more embodiments, monitoring the softphone client may include monitoring resources used by the softphone client for sending and receiving VoIP communications. In response to detecting the active call at the softphone client, a call state stored locally at the host device (e.g., the call state 144 of the host device 106, etc.) is set to active at step 304. In this way, the call state of a softphone client may be continuously tracked.

At step 306, a doff event is received from a headset worn to communicate during the call active at the softphone client. The headset doff event may be received from the headset based on the output of a don/doff sensor at the headset. In response to receiving the doff event, a worn state stored locally at the host device (e.g., the worn state 146 of the host device 106, etc.) is updated, at step 308, to reflect the doffed state of the headset.

Moreover, at step 310, a mute command is sent to the headset. In one or more embodiments, the mute command is sent to the headset in response to receiving the doff event and/or setting the worn state to doffed at step 308. The mute command comprises any message to the headset that causes the headset to stop further transmission of a signal that contains audio originating from a microphone of the headset. In one or more embodiments, when the headset receives the mute command, the headset may respond with a message that confirms it has been muted. For example, the headset may respond with an acknowledgement message, or a mute event indicating that the microphone has been muted. Upon being muted, a value stored locally at the headset may be updated to reflect the muted state. For example, the mute state 118 of the headset 104, described in the context of FIG. 1B, above, may be updated to reflect that the headset 104 is muted. Moreover, at step 312, a locally stored mute state of the headset manager is set to muted. For example, the mute state 148 of the headset manager 142, described in the context of FIG. 1C, above, may be updated to reflect that the headset 104 is muted. In this way, the microphone of a headset may be automatically muted during an active phone call in response to the headset being removed from the head of the wearing user.

Further, at step 314 a don event is received from the headset previously worn to communicate during the call active at the softphone client. In other words, the don event may be received while the worn state is set to doffed, the call state is set to active, and the mute state is set to muted at the headset manager. The headset don event may be received from the headset based on the output of the don/doff sensor at the headset. In response to receiving the don event, the worn state stored locally at the host device (e.g., the worn state 146 of the host device 106, etc.) is updated, at step 316, to reflect the donned state of the headset. However, at this point, the microphone is not unmuted. In particular, the active call detected at step 302 has continued at the softphone client while the headset was doffed, and the don event received at step 314 is not considered an adequate expression of intent from the user to resume voice transmissions. Accordingly, the headset manager performing the method 300 does not unmute the microphone of the headset until the user shows a clear intent to resume voice transmissions. In other words, after setting the worn state to donned at step 316, the method 300 waits to receive a clear expression of user intent to unmute the microphone of the headset.

At step 318, the intention to resume voice transmissions is received as an unmute event. In one or more embodiments, the unmute event may be received from the headset in response to the user manipulating a user control, such as a button, of the headset. In one or more embodiments, the unmute event may be received from the softphone client in response to the user manipulating a user interface control of the softphone client. In one or more embodiments, the unmute event may be received at the headset manager, in response to the user manipulating a user interface control of the headset manager. In any case, the unmute event received at step 318 is received based on an overt user action.

In response to receiving the unmute event at step 318, an unmute command is sent, at step 320, to the headset. The unmute command comprises any message to the headset that causes the headset to begin or resume transmission of a signal that contains audio originating from the microphone of the headset. In one or more embodiments, when the headset receives the unmute command, the headset may respond with a message that confirms it has been unmuted, or it may simply begin transmitting audio. Upon being unmuted, a value stored locally at the headset may be updated to reflect the unmuted state. For example, the mute state 118 of the headset 104, described in the context of FIG. 1B, above, may be updated to reflect that the headset 104 is not currently muted.

Moreover, at step 322, a locally stored mute state of the headset manager is set to unmuted. For example, the mute state 148 of the headset manager 142, described in the context of FIG. 1C, above, may be updated to reflect that the headset 104 is not presently muted. In this way, the mute states of the headset and the headset manager may be synchronized.

At step 324, the termination of the previously active call is detected. The call termination may be detected by monitoring the softphone client, as described above. In response to detecting the call termination at the softphone client, the call state stored locally at the host device (e.g., the call state 144 of the host device 106, etc.) is set to inactive at step 326. Again, in this way, the call state of the softphone client may be continuously tracked.

Moreover, at step 328, a mute command is sent to the headset. In one or more embodiments, the mute command is sent to the headset in response to detecting the call termination at step 324 and/or setting the call state to inactive at step 326. As noted previously, the headset may respond with a message that confirms it has been muted. Upon being muted, a value stored locally at the headset is updated to reflect the muted state. Moreover, at step 330, a locally stored mute state of the headset manager is set to muted. In this way, the microphone of the headset may be automatically muted in response to the termination of a call at the softphone client, thereby ensuring that no audio transmissions are inadvertently sent from the headset to the host device after the call ends.

Figure 4:
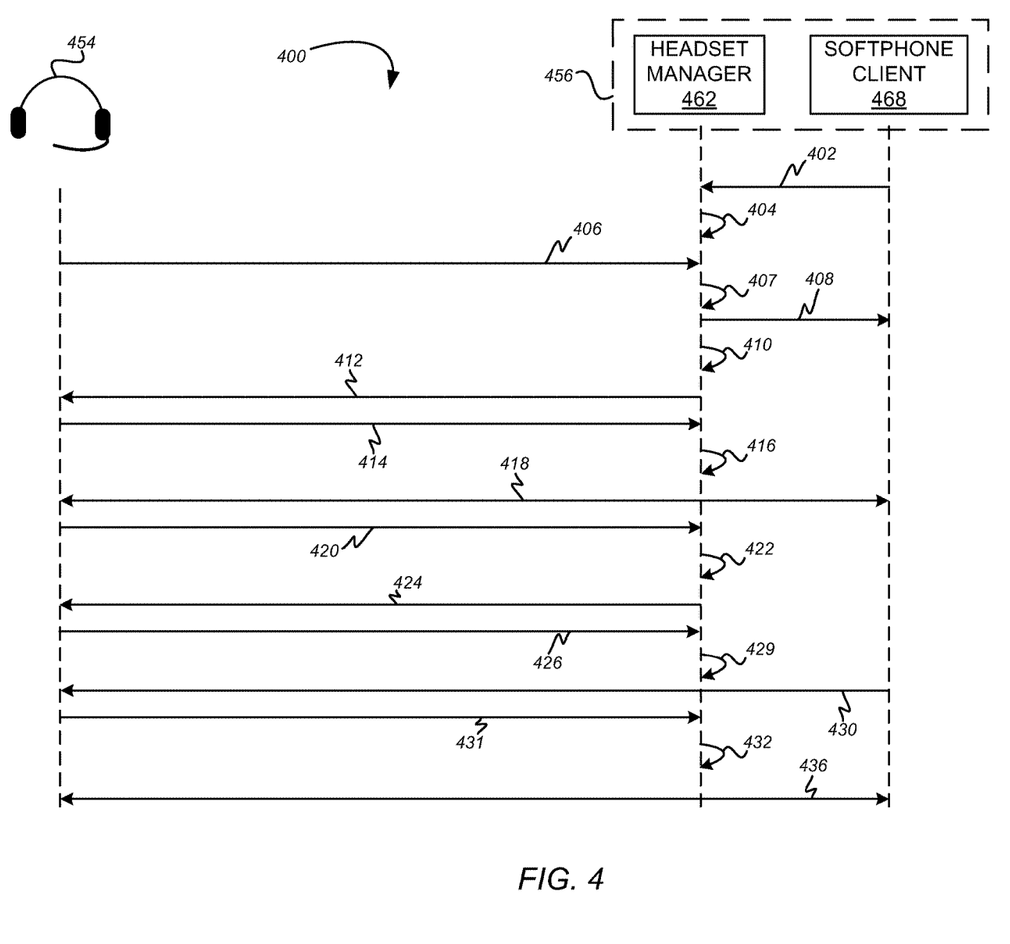
FIG. 4 is a communication flow showing an example of sensor-based mute control for a softphone client, in accordance with one or more embodiments of the invention.

Referring to FIG. 4, a communication flow 400 is shown in accordance with one or more embodiments of the invention. The communication flow 400 illustrates an example of sensor-based mute control for a softphone client, based on the communications of a headset 454, a headset manager 462, and a softphone client 468. As shown in FIG. 4, both the headset manager 462 and the softphone client 468 reside on a host device 456. The headset 454 is communicatively coupled to the host device 456.

As depicted in FIG. 4, the headset manager 462 detects, at operation 402, an incoming call to the softphone client 468. The incoming call may be detected by monitoring the softphone client 468. In response to detecting the incoming call, the headset manager 462 starts a timer at operation 404, which is used to determine an elapsed time between the softphone client 468 receiving the incoming call, and the call being answered by a user of the softphone client 468. The softphone client 468 may alert the user to the incoming call by way of a displaying a visual alert at the host device 456, or playing an auditory alert.

At operation 406, a don event is received from the headset 454. The headset don event may be received from the headset based on the output of a don/doff sensor at the headset 454. In particular, the don event may be received from the headset 454 in response to a user placing the headset 454 on his or her head while the call is incoming. In response to the headset don event received at operation 406, a worn state is updated at the headset manager 462, at operation 407. In particular, the worn state is updated to reflect that the headset 454 has been donned by the user. Moreover, in response to the updated worn state indicating that the headset 454 has been donned while the call is incoming, the headset manager 462 sends, at operation 408, a command to the softphone client 468, instructing the softphone client 468 to answer the incoming call.

Also, the headset manager 462 compares the elapsed time of the timer to a predetermined threshold at operation 410. In response to determining that the elapsed time is less than the predetermined threshold at operation 410, the headset manager 462 sends an unmute command, at operation 412, to the headset 454. In response to the unmute command, the headset 454 responds with a message that confirms it has been unmuted, at operation 414. Responsive to the confirmation message from the headset 454, the headset manager 462 updates, at operation 416, a mute state it tracks for the headset 454. The updated mute state at the headset manager 462 indicates that the headset 454 is not currently muted. At this time, the headset 454 and the softphone client 468 may exchange bidirectional audio communications 418. More specifically, words spoken by the user of the headset 454 may be picked up by the microphone of the headset 454, and transmitted as an audio signal to the softphone client 468 for sending out over a network to other call participants. Similarly, by way of one or more speakers at the headset 454, the user may hear the words that are spoken by the other call participants.

Sometime during the call, the user doffs the headset 454. In turn, the headset 454, at operation 420, sends a doff event to the headset manager 462. In response to receiving the doff event, at operation 422 the headset manager 462 updates the worn state of the headset 454, as tracked at the headset manager 462, to indicate that the headset 454 is currently doffed. Moreover, in response to updating the worn state to doffed, the headset manager 462 sends a mute command to the headset 454 at operation 424. Upon receiving the mute command, the headset 454 ceases further transmission of a signal that contains audio picked up by the microphone of the headset 454. Upon being muted, a value stored locally at the headset 454 may be updated to reflect the muted state (not shown). Also, the headset 454 responds, at operation 426, with a message confirming that the headset 454 is muted. Upon receiving this message, the headset manager 462 updates, at operation 429, the mute state of the headset 454 that is tracked at the headset manager 462 to indicate that the headset 454 is muted. At this point, the softphone client 468 utilizes the headset 454 as a render endpoint for communications 430, however all applications present on the host device 456 are precluded from capturing audio from the muted microphone of the headset 454.

Subsequently, the user of the headset 454 presses an unmute button on the headset 454. In response, the headset 454 transmits, at operation 431, an unmute event to the headset manager 462, which causes the headset manager 462 to update, at operation 432, the mute state of the headset 454 as tracked by the headset manager 462. Also, in response to the interaction of the user and the unmute button, the headset 454 is unmuted. In other words, in such a scenario, it is contemplated that the headset 454 may be unmuted without receiving an unmute command from the headset manager 462. Although the unmute event is shown to originate from the headset 454, it is understood that the unmute event may arise from the softphone client 468, in response to a similar user interaction. If the unmute command were to originate from the softphone client 468, then the headset manager 462 would, in response, send an unmute command to the headset 454, instructing that mute should be disabled. After receiving the unmute event from the headset 454 at operation 430, bidirectional communications 436 resume between the headset 454 and the softphone client 468. The headset manager 462 may continue to monitor the call to identify one or more additional headset doff events or headset mute events. Also, the headset manager 462 may continue to monitor the call for call termination. In response to detecting the termination of the call, the headset manager 462 may command the microphone of the headset 454 to become muted, as described above.

Accordingly, set forth above are systems, methods and computer programs for sensor-based mute control of a softphone client that is not easily circumvented by a user, eliminates any potential for repetitive strain injury, and does not require the purchase of additional hardware for implementation at a user's computer. The systems and methods presented above provide an efficient solution to secure voice transmission requirements in environments deploying softphones, while eliminating the security concerns inherent to traditional hardware, such as handset push-to-talk buttons. In particular, by relying on state information from a headset sensor to provide a user-specified transmit action, a physical push-to-talk button is no longer needed, and the headset microphone may instead be automatically muted by way of a headset management application that is communicatively coupled with a softphone client.

A number of implementations have been described. Nevertheless, various modifications may be made without departing from the scope of the disclosure.

What is claimed is:

1. A method, comprising:
    monitoring a softphone client
    detecting an incoming call to the softphone client
    in response to detecting the incoming call, starting a timer;
    receiving, from a headset, a don event;
    in response to receiving the don event from the headset, comparing an elapsed time of the timer to a predetermined time threshold; and
    sending an unmute command to the headset based on the comparison of the elapsed time to the predetermined time threshold;
    wherein the elapsed time includes one of:
        a time elapsed between starting the timer and sending an answer call command to the softphone client,
        a time elapsed between starting the timer and receiving the don event from the headset, or
        a time elapsed between starting the timer and the softphone client answering the incoming call.

2. The method of claim 1, wherein the unmute command is sent to the headset in response to a determination that the predetermined time threshold is greater than the elapsed time.

3. The method of claim 2, wherein the predetermined time threshold is between 5 and 15 seconds.

4. The method of claim 1, comprising, prior to monitoring the softphone client:
    detecting the headset;
    in response to detecting the headset, sending a mute command to the headset; and
    setting a mute state to muted.

5. A method, comprising:
    detecting an active call at a softphone client;
    based on the active call at the softphone client, setting a call state to active;
    during the active call, receiving a doff event from a headset;
    setting a worn state to doffed;
    based on the worn state being set to doffed, sending a mute command to the headset;
    setting a mute state to muted;
    while the worn state is set to doffed, the call state is set to active, and the mute state is set to muted, receiving a don event from the headset;
    in response to receiving the don event from the headset, setting the worn state to donned;
    after setting the worn state to donned, waiting to receive an unmute event; and
    receiving the unmute event.

6. The method of claim 5, comprising:
    detecting a termination of the active call;
    in response to detecting the termination of the active call, setting the call state to inactive;
    in response to setting the call state to inactive, sending another mute command to the headset; and
    setting the mute state to muted.

7. The method of claim 5, wherein the active call at the softphone client is detected by monitoring the softphone client.

8. The method of claim 5, wherein the active call at the softphone client is detected by monitoring one or more resources utilized by the softphone client for voice over Internet Protocol (VoIP) communications.

9. The method of claim 5, wherein the mute state is synchronized with another mute state stored at the headset.

10. The method of claim 5, wherein the unmute event is received from the headset in response to a user manipulating a user control of the headset.

11. The method of claim 5, wherein the unmute event is received from the softphone client in response to a user manipulating a user interface control of the softphone client.

12. The method of claim 5, comprising, after sending the mute command to the headset, receiving an acknowledgement message from the headset.

13. The method of claim 12, wherein receiving the acknowledgement message includes receiving an empty transmit channel from the headset.

14. The method of claim 12, wherein the mute state is set to muted in response to receiving the acknowledgement message from the headset.

15. A system for sensor-based mute control of a softphone client, comprising:
    a headset manager storing a call state, a worn state, a mute state, and a predetermined time threshold;
    at least one processor; and
    memory coupled to the at least one processor, the memory having stored therein instructions which, when executed by the at least one processor, cause the at least one processor to perform a process including:
        monitoring a softphone client,
        while monitoring the softphone client, detecting an incoming call to the softphone client, in response to detecting the incoming call:
  updating the call state, and
  starting a timer,
receiving, from a headset, a don event,
in response to receiving the don event from the headset:
  updating the worn state, and
  comparing an elapsed time of the timer to the predetermined time threshold,
sending an unmute command to the headset based on the comparison of the elapsed time to the predetermined time threshold, and
updating the mute state.

16. The system of claim 15, wherein the elapsed time includes one of:
  a time elapsed between starting the timer and receiving the don event from the headset,
  a time elapsed between starting the timer and sending an answer call command to the softphone client, and
  a time elapsed between starting the timer and the softphone client answering the incoming call.

17. The system of claim 16, wherein the unmute command is sent to the headset in response to a determination that the predetermined time threshold is greater than the elapsed time.

* * * * *